(12) United States Patent  (10) Patent No.: US 7,972,637 B2
Acar et al.  (45) Date of Patent: Jul. 5, 2011

(54) METHOD FOR MAKING CENTER-FILLED CHEWING GUM PIECES

(75) Inventors: Nesim Acar, Istanbul (TR); Albert Levi, Istanbul (TR)

(73) Assignee: Kent Gida Maddeleri Sanayii ve Ticaret Anonim Sirketi, Kocaeli (TR)

( * ) Notice: Subject to any disclaimer, the term of this patent is extended or adjusted under 35 U.S.C. 154(b) by 62 days.

(21) Appl. No.: 12/478,414

(22) Filed: Jun. 4, 2009

(65) Prior Publication Data

US 2010/0209552 A1  Aug. 19, 2010

Related U.S. Application Data

(62) Division of application No. 11/392,430, filed on Mar. 29, 2006, now Pat. No. 7,556,487.

(51) Int. Cl.
*A23G 4/04* (2006.01)
(52) U.S. Cl. .............................. 426/5; 426/516; 426/518
(58) Field of Classification Search .................. 426/3, 5, 426/516, 518
See application file for complete search history.

(56) References Cited

U.S. PATENT DOCUMENTS

| | | |
|---|---|---|
| 1,348,081 A | 7/1920 | Brach |
| 2,098,753 A | 11/1937 | Mulch |
| 2,770,571 A | 11/1956 | Vance et al. |
| 3,035,302 A | 5/1962 | Lysobey |
| 3,188,983 A | 6/1965 | Tomberg |
| 3,269,088 A | 8/1966 | Kath |
| 3,536,074 A | 10/1970 | Aufhauser |
| 3,605,434 A | 9/1971 | Boese |
| 3,708,995 A | 1/1973 | Berg |
| 3,806,290 A | 4/1974 | Graff et al. |
| 3,857,963 A | 12/1974 | Graff et al. |
| 3,894,154 A | 7/1975 | Graff et al. |
| 4,015,021 A | 3/1977 | Harima et al. |
| 4,156,740 A | 5/1979 | Glass et al. |
| 4,250,196 A | 2/1981 | Friello |
| 4,251,201 A | 2/1981 | Krysiak |
| 4,269,860 A | 5/1981 | Ogawa et al. |
| 4,301,178 A | 11/1981 | Witzel et al. |
| 4,513,012 A | 4/1985 | Carroll et al. |
| 4,543,769 A | 10/1985 | Schimitz |
| 4,762,719 A | 8/1988 | Forester |
| 4,888,192 A | 12/1989 | Ramnarine |
| 4,912,943 A | 4/1990 | Hubert et al. |
| 4,975,288 A | 12/1990 | Hager et al. |

(Continued)

FOREIGN PATENT DOCUMENTS

DE  955 921  1/1957

(Continued)

*Primary Examiner* — Yogendra N Gupta
*Assistant Examiner* — Joseph Leyson
(74) *Attorney, Agent, or Firm* — Hoffmann & Baron, LLP (57) ABSTRACT

A dual-filled gum piece is provided having a first cavity filled with a liquid filling and a second cavity filled with a powder filling. The gum pieces are produced by extruding a gum rope having two separate channels respectively filled with liquid and powder, sizing and shaping the gum rope, cooling the gum rope, cutting the rope into discrete gum pieces, and finally cooling the gum pieces. The gum pieces optionally can be coated with a hard coating. In other aspects for single- and dual-filled gums, a process for making the gum pieces employs a rope sizer that reduces the diameter of the gum rope and shapes it to have a non-round cross-section, and a multi-story cooling tunnel having individually motor-driven conveyors.

7 Claims, 7 Drawing Sheets

U.S. PATENT DOCUMENTS

| | | |
|---|---|---|
| 5,125,819 A | 6/1992 | Hager et al. |
| 5,682,733 A | 11/1997 | Perrone |
| 6,214,389 B1 * | 4/2001 | Hoffman et al. ............ 426/5 |
| 6,235,318 B1 | 5/2001 | Lombardy, Jr. et al. |
| 6,280,780 B1 | 8/2001 | Degady et al. |
| 6,284,291 B1 | 9/2001 | Siecke et al. |
| 6,422,853 B1 | 7/2002 | Markwardt et al. |
| 6,472,001 B1 | 10/2002 | Bunkers et al. |
| 6,531,174 B2 | 3/2003 | Barrett et al. |
| 6,558,727 B2 | 5/2003 | Degady et al. |
| 6,838,098 B2 | 1/2005 | Bunkers et al. |
| 2002/0192330 A1 | 12/2002 | Bunkers et al. |
| 2005/0100633 A1 | 5/2005 | Bunkers et al. |
| 2006/0003050 A1 | 1/2006 | Nissen |
| 2008/0057154 A1 | 3/2008 | Acar |
| 2009/0029018 A1 | 1/2009 | Elejalde et al. |
| 2009/0029019 A1 | 1/2009 | Jani |

FOREIGN PATENT DOCUMENTS

| | | |
|---|---|---|
| DE | 26 43 855 | 3/1978 |
| EP | 1 000 549 | 5/2000 |
| EP | 1 000 551 | 12/2000 |
| FR | 626 784 | 12/1926 |
| GB | 746850 | 3/1956 |
| GB | 761441 | 11/1956 |
| GB | 2 024 089 | 1/1980 |
| JP | 62158455 | 7/1987 |
| WO | WO 01/58273 | 8/2001 |

* cited by examiner fig.1.

METHOD FOR MAKING CENTER-FILLED CHEWING GUM PIECES

CROSS-REFERENCE TO RELATED APPLICATION

The present application is a divisional of U.S. patent application Ser. No. 11/392,430 filed on Mar. 29, 2006 now U.S. Pat. No. 7,556,487, the entire disclosure of which is hereby incorporated herein by reference.

BACKGROUND OF THE INVENTION

The present invention relates to chewing gum, and more particularly relates to filled chewing gum pieces and to devices and methods for making such filled chewing gum pieces.

Filled chewing gum pieces of various shapes have been developed and sold for many years by the assignee of the present application as well as others. A filled chewing gum piece has an internal cavity that is filled with either a liquid filling or a powder filling. The filled gum pieces are typically coated with a hard outer coating or shell. The assignee has sold liquid-filled gum pieces of generally "lemon-shaped" configuration, as well as powder-filled gum pieces of generally "lentil-shaped" configuration and powder-filled gum pieces of round tablet form sometimes referred to as "dragees".

Such filled gum pieces have rapidly gained in popularity in recent years, owing in part to the novel taste experiences such gum pieces make possible.

BRIEF SUMMARY OF THE INVENTION

The present invention represents a further development in the field of filled gum pieces.

An apparatus for making a filled chewing gum product in accordance with one embodiment of the invention comprises:
an extruder comprising:
an extruder head defining a chamber for receiving a molten gum composition and including a die defining a die orifice through which the molten gum composition is forced from the chamber under pressure so as to extrude a rope of gum from the die orifice;
a center filling mechanism having a filler tube extending through the die orifice; and
a feed passage extending through the extruder head and connecting with the filler tube for feeding a filling through the filler tube, such that the gum rope extruded through the die orifice is formed to have a channel filled with the filling;
a rope sizer structured and arranged to receive the gum rope from the extruder and to reduce the cross-sectional size of the gum rope and to shape the gum rope to have a non-round cross-sectional shape with a greater dimension in a width direction than in a height direction;
a cooling tunnel structured and arranged to receive the gum rope from the rope sizer and to cool the gum rope; and
a cutter structured and arranged to receive the gum rope from the cooling tunnel and to cut the gum rope into discrete gum pieces each having a cavity filled with the filling.

The cooling tunnel comprises a series of individual belt conveyors each extending substantially horizontally and parallel to the machine direction and spaced apart from one another in a vertical direction such that the belt conveyors substantially lie in a vertical plane, the belt conveyors including an uppermost belt conveyor and a lowermost belt conveyor each traveling in the machine direction and a plurality of intermediate belt conveyors, wherein each belt conveyor travels in a direction opposite to the immediately prior belt conveyor, and wherein the gum rope is threaded in a serpentine fashion through the cooling tunnel such that the gum rope is carried along one of the belt conveyors traveling in the machine direction and then along one or more subsequent ones of the belt conveyors, finally exiting the cooling tunnel from the lowermost belt conveyor. The cooling tunnel further comprises blowers for blowing air across the gum rope.

The belt conveyors can be driven in various ways. In a preferred embodiment, the belt conveyors are independently driven by individual drive motors. Advantageously, the drive motors are variable-speed motors whose speeds are independently controllable.

In a preferred embodiment, the belt conveyors are driven by the drive motors such that a ratio of the speed of the lowermost belt conveyor belt to the speed of the uppermost belt conveyor is greater than or equal to 1.0 and less than about 1.3, more preferably less than about 1.2, still more preferably less than about 1.15, and still more preferably less than about 1.1.

In one embodiment of the invention, the cooling tunnel has a first entrance that leads onto the uppermost belt conveyor, and a second entrance that leads onto an intermediate belt conveyor, thereby allowing the cooling tunnel to be operated in either a first configuration wherein the gum rope enters through the first entrance or a second configuration wherein the gum rope enters through the second entrance. In the first configuration, the gum rope travels along a greater distance through the cooling tunnel than in the second configuration. In some cases, the gum rope may require greater cooling time, in which case the first configuration is employed. In other cases requiring less cooling time, the second configuration can be used.

Alternatively, the second entrance can lead onto the lowermost belt conveyor. This would be useful when the cooling time required for the gum rope is sufficiently provided by using only the lowermost belt conveyor.

The center filling mechanism can feed a liquid filling or a powder filling into the channel of the gum rope.

In another aspect of the invention, an apparatus for making a dual-filled chewing gum product employs a center filling mechanism having a liquid filler tube extending through the die orifice and a powder filler tube extending through the die orifice and spaced from the liquid filler tube. A liquid feed passage extends through the extruder head and connects with the liquid filler tube for feeding a liquid filling through the liquid filler tube, and a powder feed passage extends through the extruder head and connects with the powder filler tube for feeding a powder filling through the powder filler tube, such that the gum rope extruded through the die orifice is formed to have a first channel filled with the liquid filling and a second channel filled with the powder filling and separate from the first channel.

The rope sizer is structured and arranged to receive the gum rope from the extruder and to reduce the cross-sectional size of the gum rope and to shape the gum rope to have a non-round cross-sectional shape with a greater dimension in a width direction along which the first and second channels are spaced than in a height direction.

The cutter is structured and arranged to receive the gum rope from the cooling tunnel and to cut the gum rope into discrete gum pieces each having a first cavity filled with the liquid filling and a second cavity filled with the powder filling.

The apparatus can further comprise a final cooling device for cooling the gum pieces.

The cutter advantageously comprises a chain die cutter.

Preferably, the rope sizer is configured such that the gum rope coming from the rope sizer travels along a substantially horizontal machine direction and has the first and second channels of the gum rope spaced apart in a horizontal cross-machine direction perpendicular to the machine direction.

The center filling mechanism in one embodiment further comprises an air tube concentrically positioned within the liquid filler tube and coupled with an air supply such that air and liquid filling are discharged together for filling the first channel in the gum rope. In a preferred embodiment, the liquid filler tube has a non-round cross-sectional shape, such as an elliptical shape.

The center filling mechanism advantageously also comprises a rotating agitator positioned within the powder filler tube and coupled with a drive mechanism such that the agitator agitates the powder being fed through the powder filler tube.

In accordance with another aspect of the present invention, a gum piece is provided having a first cavity filled with a liquid filling and a second cavity filled with a powder filling.

In one embodiment of the invention, the gum piece further includes a hard shell covering the outer surface of the gum piece. The gum piece in accordance with one embodiment has a generally pillow-shaped configuration defining two opposite major surfaces and side edges of the gum piece that extend between the two opposite major surfaces. The side edges of the gum piece are substantially flat in side and front elevations. The gum piece can have a generally rectangular shape in plan view, with at least two side edges of the gum piece being linear in plan view. In one embodiment, all four side edges are linear in plan view. The gum piece can have a length exceeding a width of the gum piece, and the first and second cavities can be spaced apart in a direction extending across the width.

The liquid filling can comprise an aqueous solution containing one or more of sweeteners, flavors, cooling agents, substances to enhance production of saliva, oral care compositions, and the like.

The powder filling likewise can comprise one or more of sweeteners, flavors, cooling agents, substances to enhance production of saliva, oral care compositions, and the like. One or more of the ingredients of the powder filling can be provided in the form of encapsulated material.

The liquid filling can have a different flavor from the powder filling. By using encapsulated flavorings in the powder filling, the gum piece can provide a dual taste experience wherein an initial burst of flavor is provided by the liquid filling upon beginning to chew, and further chewing then causes the initial flavor to dissipate and the different flavor of the powder filling to become dominant. It is also possible for the two flavors to mix during an interim period so as to form yet a third flavor, such that a triple flavor experience is provided. The gum itself can also include a flavor, which can be the same as or different from the flavors of the liquid and powder fillings. When the gum piece includes a hard coating, the coating can also include one or more flavorings. Thus, the invention makes possible a substantial versatility with respect to multiple-flavor experiences.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A dual-filled gum piece 20 in accordance with one embodiment of the invention is depicted in FIGS. 1 through 4. The gum piece 20 comprises a chewing gum composition 21 formed into a discrete piece that defines a first internal cavity 22 and a separate second internal cavity 24. The first cavity 22 is filled with a liquid filling 26, while the second cavity 24 is filled with a powder filling 28. The chewing gum piece 20 can also include a hard outer coating or shell (not shown).

The liquid filling 26 can comprise an aqueous solution containing one or more of sweeteners, flavors, cooling agents, substances to enhance production of saliva, oral care compositions, and the like. Aqueous bulk sweetener solutions such as those containing sorbitol, xylitol, lactitol, maltitol, glycerol, hydrogenated isomaltulose and other polyols, or combinations thereof, may be used in the liquid filling. Thickeners can also be included, such as gelatin, xanthan gum, guar gum, acacia gum, pectin, carrageenan, cellulose gum, or the like.

The powder filling 28 likewise can comprise one or more of sweeteners, flavors, cooling agents, substances to enhance production of saliva, oral care compositions, and the like. One or more of the ingredients of the powder filling can be provided in the form of encapsulated material.

Powder bulk sweeteners that can be used in the powder filling may include sweeteners such as sugar alcohols, including but not limited to sorbitol, mannitol, xylitol, hydrogenated starch hydrolysates, lactitol, maltitol, hydrogenated isomaltulose, or the like, alone or in combination. High-intensity sweeteners may also be used and are commonly used with sugarless bulk sweeteners. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination. One or more of the ingredients of the powder filling can be provided in the form of encapsulated material.

Flavoring agents that can be used in the gum composition and/or in the liquid filling and/or in the powder filling include essential oils and artificial flavors, or mixtures thereof, including natural oils derived from plants and fruits such as citrus oils, peppermint oil, spearmint oil, other mint oils, clove oil, oil of wintergreen, anise, and the like. Artificial flavorings can comprise fruit flavors such as strawberry, raspberry, blueberry, grape, apple, cherry, banana, melon, or the like.

Figure 1:
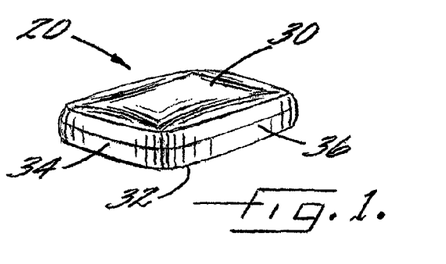
FIG. 1 is a perspective view of a gum piece in accordance with one embodiment of the invention.
Figure 2:
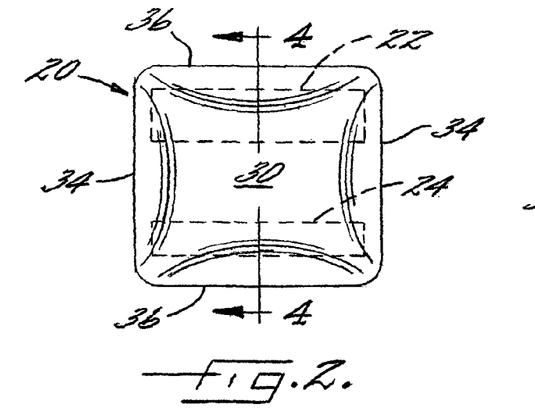
FIG. 2 is a plan view of the gum piece.

The gum piece 20 can be formed in various shapes and sizes. In the illustrated embodiment, the gum piece has a generally rectangular shape in plan view (FIG. 2). The gum piece has a pair of opposite major surfaces 30 and 32 each of which is generally convex in a direction away from the other major surface, although each major surface can include a portion that is generally planar or flat in at least one direction. The gum piece also has two opposite side edges 34 that are generally parallel to each other, and two opposite side edges 36 that are generally parallel to each other and generally perpendicular to the side edges 34. The side edges 34 can be substantially linear in plan view, or can be concave or convex. The side edges 36 can have a slight concavity in plan view, or can be linear or convex in plan view. In a preferred embodiment as shown, the side edges 34, 36 are linear in plan view. Furthermore, the gum piece need not be rectangular in plan view, but can have another shape such as elliptical, oval, round, etc. In cross-section (FIGS. 3 and 4), the gum piece can have a generally elliptical or oval shape.

In one embodiment as shown, the gum piece is rectangular and has a length (measured between the side edges 34) exceeding a width of the gum piece (measured between the outermost parts of the side edges 36). The first and second cavities 22, 24 are spaced apart in the width direction.

Figure 3:
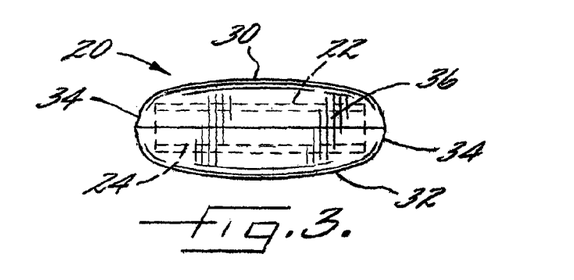
FIG. 3 is a cross-sectional view of the gum piece, showing the two separate cavities.
Figure 4:
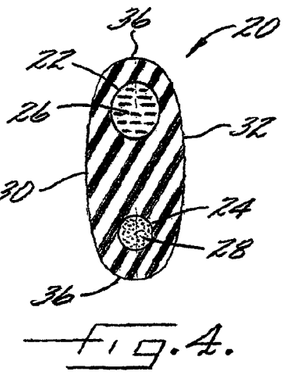
FIG. 4 is a side elevation of the gum piece.

The liquid-filled cavity 22 advantageously is larger in cross-section than the powder-filled cavity 24, although such is not necessarily the case. In cross-section, the cavities 22, 24 can be round or non-round. As shown in FIG. 3, the liquid-filled cavity 22 advantageously has a non-round (e.g., elliptical or oval) shape whose major dimension extends in the width direction of the gum piece and whose minor dimension extends in the height direction of the gum piece.

Figures 5, 6:
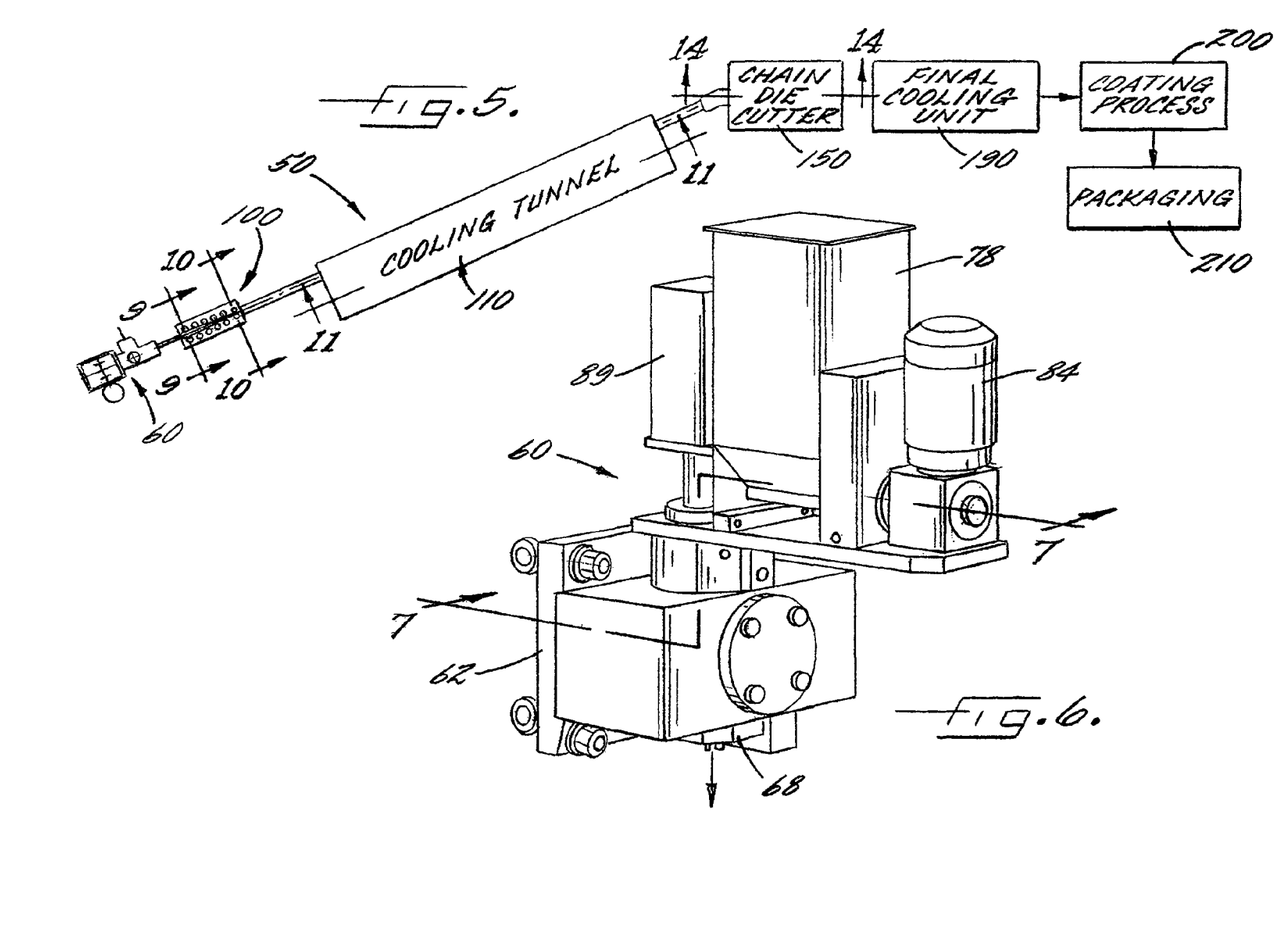
FIG. 5 is a top view of an apparatus for making filled gum pieces in accordance with one embodiment of the invention.
FIG. 6 is an isometric view of an extruder and center filling assembly useful in the production of dual-filled gum pieces in accordance with one embodiment of the invention.

An apparatus 50 for making dual-filled gum pieces in accordance with one embodiment of the invention is shown in FIG. 5, and FIGS. 6 through 14 depict various components of the apparatus in greater detail. As illustrated in FIG. 5, the apparatus includes an extruder and center filling assembly 60 for extruding a gum rope that has a first channel filled with a liquid filling and a second channel filled with a powder filling, a rope sizer 100 for reducing the cross-sectional size of the gum rope and shaping the gum rope to have a non-round shape in cross-section, a cooling tunnel 110 for cooling the sized and shaped gum rope, a cutter 150 for cutting the gum rope into discrete gum pieces, and a final cooling unit 190 for cooling the gum pieces. The gum pieces discharged from the final cooling unit can then be transferred to a further processing such as a coating process 200 and a packaging process 210.

Figure 7:
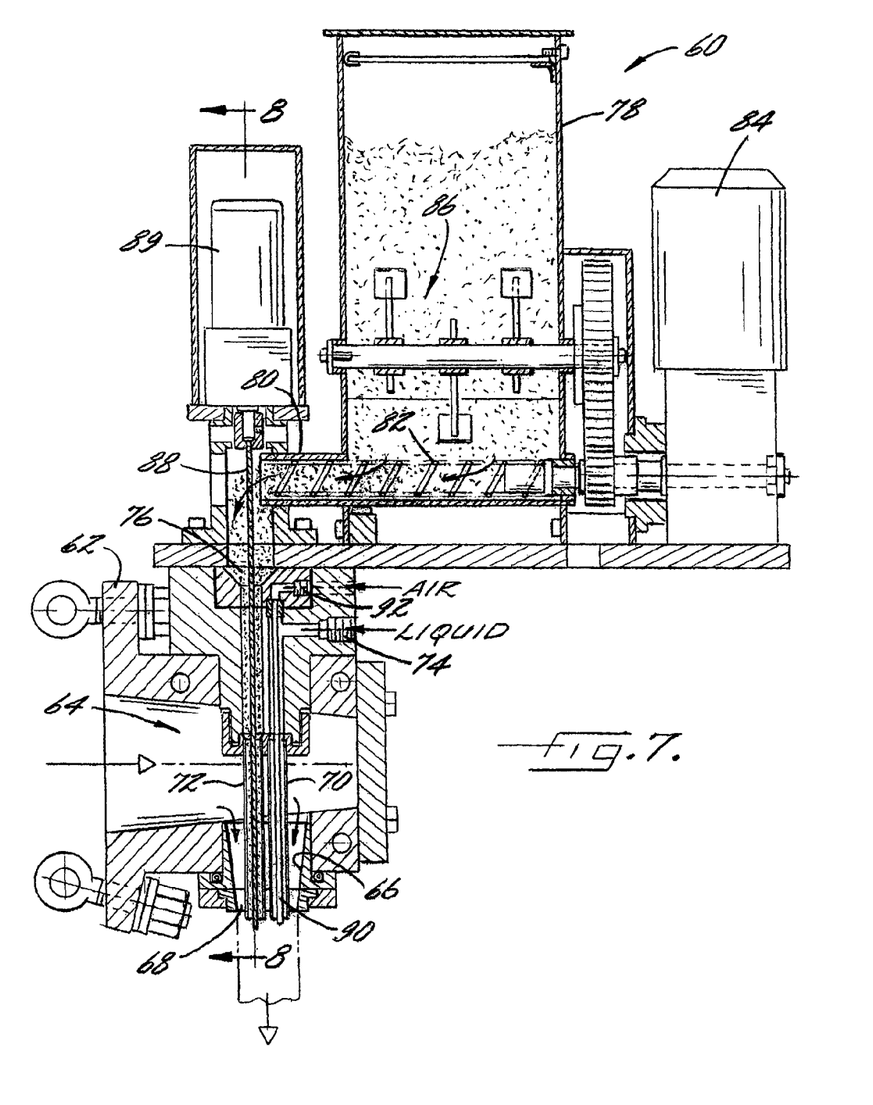
FIG. 7 is a cross-sectional view through the extruder and center filling assembly.
Figures 8, 9, 10:
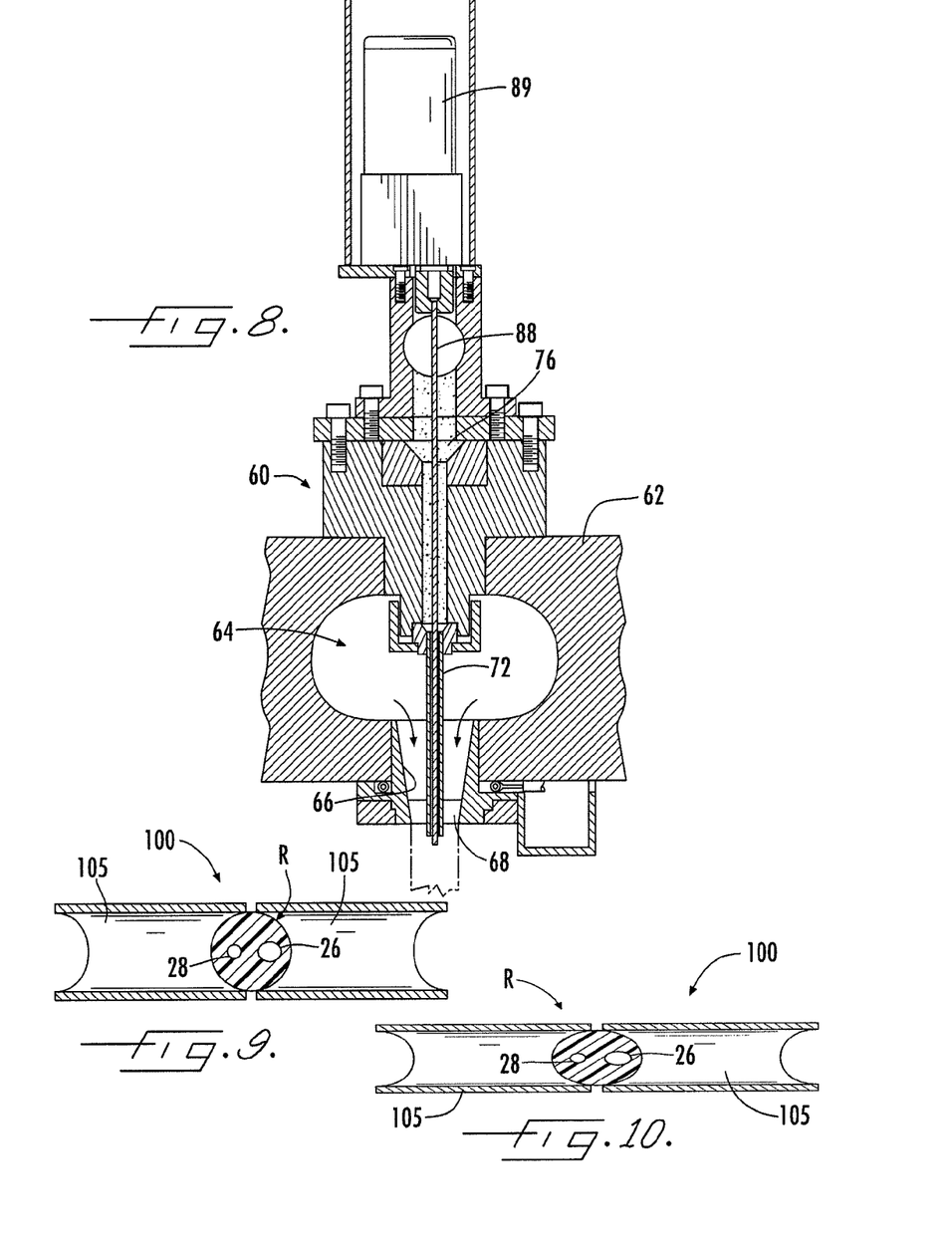
FIG. 8 is a cross-sectional view along line 8-8 of FIG. 7.
FIG. 9 is a cross-sectional view along line 9-9 in FIG. 5, showing a section through a first roller pair of the rope sizer.
FIG. 10 is a cross-sectional view along line 10-10 in FIG. 5, showing a section through a last roller pair of the rope sizer.

The extruder and center filling assembly 60 is depicted in detail in FIGS. 6 through 8. The extruder includes an extruder head 62 that defines a chamber 64 for receiving a molten and flowable gum composition from a suitable device such as an extruder screw (not shown) coupled with the extruder head. The extruder head further includes a die 66 defining a die orifice 68 through which the molten gum composition is forced from the chamber 64 under pressure so as to extrude a rope of gum from the die orifice.

The assembly 60 further comprises a center filling mechanism having a liquid filler tube 70 extending through the die orifice 68 and a powder filler tube 72 extending through the die orifice and spaced from the liquid filler tube. The extruder head 62 defines a liquid feed passage 74 extending through the extruder head and connecting with the liquid filler tube 70 for feeding a liquid filling through the liquid filler tube. The extruder head also defines a powder feed passage 76 extending through the extruder head and connecting with the powder filler tube 72 for feeding a powder filling through the powder filler tube. Accordingly, the gum rope extruded through the die orifice 68 is formed to have a first channel filled with the liquid filling and a separate second channel filled with the powder filling.

The center filling mechanism further includes a powder hopper 78 that contains the powder filling. The hopper has a discharge tube 80 through which the powder filling is discharged with the aid of a feed screw 82 driven by a motor 84. The motor 84 also drives a rotating agitator 86 disposed in the hopper 78 for agitating the powder filling to prevent agglomeration, clumping, or caking of the powder filling. The powder filling is discharged from the tube 80 into the powder feed passage 76 of the extruder head. A rotating agitator 88 extends down the center of the powder feed passage 76 and the powder filler tube 72 for agitating the powder filling to prevent agglomeration, clumping, or caking of the powder filling so that the powder filling flows smoothly and continuously through the powder filler tube. The agitator 88 is driven by a motor 89.

The center filling mechanism also includes an air tube 90 that extends down the middle of the liquid filler tube 70 for blowing air under a slightly superatmospheric pressure into the liquid-filled channel of the gum rope to assist in the filling of the channel and to prevent the development of a vacuum in the liquid-filled channel that could cause the gum rope or the finished gum pieces to shrink or distort. The air tube 90 is connected to an air feed passage 92 in the extruder head 62, which receives pressurized air from a suitable source (not shown).

The rope sizer 100 receives the gum rope from the extruder and center filling mechanism assembly 60. With reference to FIGS. 9 and 10, the rope sizer comprises a series of roller pairs arranged one after the other. Each pair of rollers 105 preferably have their rotational axes oriented vertically (although a horizontal orientation can alternatively be used) and parallel to each other, and the outer peripheries of the two rollers are spaced apart to define a space for receiving the gum rope R. The rollers rotate in opposite directions such that the gum rope is gripped by the outer peripheries of the rollers and is pulled along the lengthwise direction of the rope. Each roller pair has an outer peripheral speed greater than that of the immediately prior roller pair such that the rope is progressively increased in speed and reduced in diameter as it advances from one roller pair to the next. As an example, the gum rope's speed can increase by about five times from the entrance of the rope sizer to the exit. The rollers preferably are also configured along their outer peripheries to impart a non-round shape to the gum rope. For example, the rollers can be configured to shape the rope such as shown in FIG. 10, wherein the rope has a greater width than its height. The liquid-filled and powder-filled channels 26, 28 of the rope are spaced apart in the width direction, and the gum rope is fed to the rope sizer such that the width direction extends horizontally along the cross-machine direction (i.e., perpendicular to the machine direction along which the gum rope advances) and the length direction of the rope extends horizontally along the machine direction. In the illustrated embodiment, the rope sizer comprise six pairs of rollers, but a different number of roller pairs can be used depending on the requirements in each instance.

After the sized and shaped gum rope exits the rope sizer 100, it is fed through the cooling tunnel 110 to cool and dry the gum rope prior to cutting. The cooling tunnel is shown in detail in FIGS. 11 through 13. The cooling tunnel includes an enclosure 112 that forms an interior space substantially isolated from the surroundings outside the enclosure. The enclosure can be formed so that at least parts of the enclosure are transparent to allow viewing of the progress of the gum rope through the tunnel. At one end of the enclosure, a refrigerant compressor 113 of a refrigeration device is arranged for compressing a suitable refrigerant and supplying the refrigerant through suitable tubing (not shown) to a series of evaporators 114 disposed in the enclosure. Fans 115 for blowing air over the coils of the evaporators are mounted in the enclosure such that cooled air is circulated through the enclosure and over the gum rope progressing therethrough. Additionally, heaters 116 are mounted in the enclosure for controlling the temperature of the air being circulated. This air conditioning system ensures that air at the desired temperature and desirably low relative humidity is circulated through the enclosure to cool and dry the gum rope.

The cooling tunnel includes a series of vertically spaced, individual belt conveyors 118 arranged inside the enclosure 112. The belt conveyors extend parallel to the length direction of the enclosure 112 and parallel to one another, and each is substantially horizontal. The belt conveyors 118 thus lie substantially in a vertical plane. The conveyors include an uppermost belt conveyor 118a and a lowermost belt conveyor 118k, and nine intermediate belt conveyors 118b through 118j disposed between the uppermost and lowermost conveyors. Each belt conveyor comprises a belt formed in an endless loop about suitable rollers or sprockets, and each belt is driven by its own separate drive motor 120. The belt conveyors 118a, 118c, 118e, 118g, 118i, and 118k all are driven so that the upper flight of the respective belt travels in the machine direction (left to right in FIGS. 11 through 13). The other belt conveyors 118b, 118d, 118f, 118h, and 118j have their upper flights traveling opposite to the machine direction (right to left in the drawings).

Figure 11:
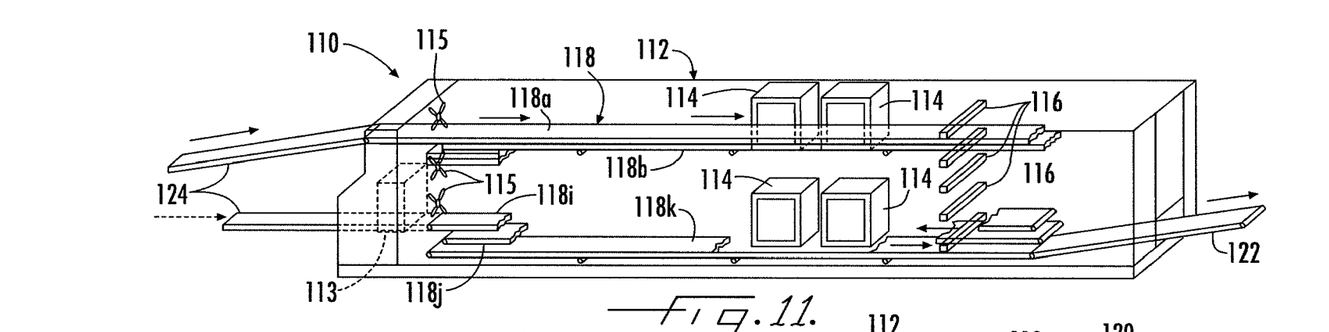
FIG. 11 is a diagrammatic perspective view of the cooling tunnel in accordance with one embodiment of the invention.
Figure 12:
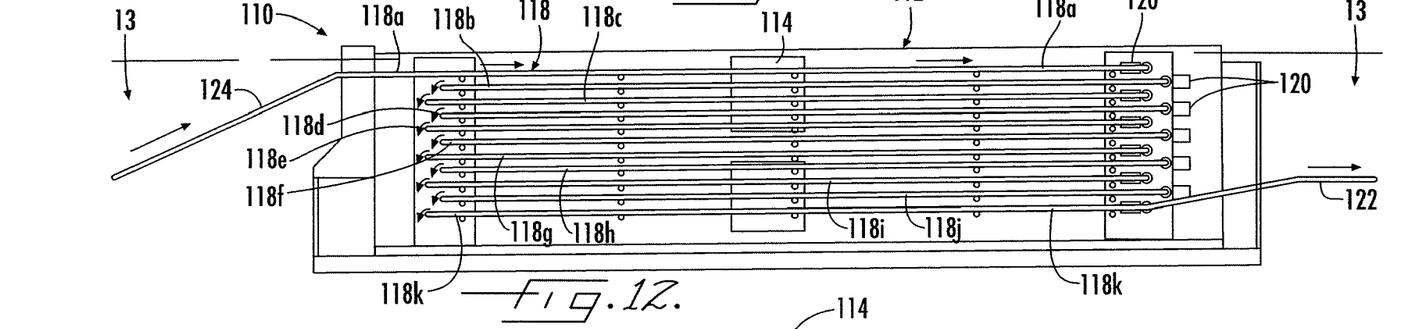
FIG. 12 is a side elevation of the cooling tunnel.
Figure 13:
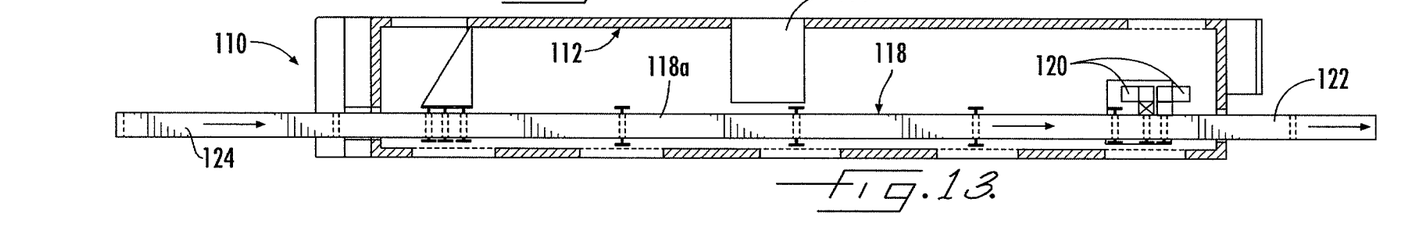
FIG. 13 is a top elevation of the cooling tunnel.

The belt conveyors 118 are structured and arranged such that the gum rope carried along the uppermost belt conveyor 118a falls off the downstream end of the upper flight of the belt onto the next belt conveyor 118b. The conveyor 118b extends slightly farther to the right in the drawings than the uppermost conveyor so that it catches the rope falling from the uppermost conveyor. The second conveyor 118b then carries the rope to the left and it falls down to the next conveyor 118c in the same manner, and so forth. The gum rope is finally carried by the lowermost conveyor 118k to a discharge conveyor 122 that advances the rope to the chain die cutter.

The gum rope is carried into the cooling tunnel 110 by an inlet conveyor 124, through an entrance opening formed in the enclosure 112. In accordance with one embodiment of the invention, the tunnel includes two or more alternative entrance openings. A first opening leads the gum rope onto the uppermost conveyor 118a. A second alternative opening leads the gum rope onto an intermediate conveyor such as conveyor 118i as shown, or onto the lowermost conveyor 118k. The first opening is used when maximum residence time and cooling of the gum rope are required. The second opening is used when less residence time and cooling are required. The inlet conveyor 124 advantageously is configured so that it can be readily moved from one entrance to another, such as through a quick-connect coupling or the like.

Each belt conveyor 118 advantageously carries the gum rope slightly faster than the immediately preceding conveyor, the objective being to prevent the gum rope from "snaking" or bending in a horizontal side-to-side fashion. Such snaking could have adverse effects on the quality of the gum pieces produced, and in extreme cases could result in the rope becoming jammed in the cooling tunnel. To prevent such snaking, the individual drive motors 120 are controlled so that a gradual increase in speed occurs through the tunnel. The cooling tunnel can include one or more sensors (not shown) for detecting the gum rope's position on each belt conveyor 118. If the rope moves out of the desired straight position by more than a predetermined amount, then an alarm can be given to alert the machine operator that an abnormal condition may exist in the tunnel. It is also possible to control the motor speeds based on the sensor output signals so as to automatically reduce any detected snaking.

The speed increase through the cooling tunnel can be varied depending upon the requirements in each case. Generally, the ratio of the outlet speed (i.e., the speed of the lowermost conveyor 118k) to the inlet speed (i.e., the speed of the uppermost conveyor 118a) will be greater than or equal to 1.0 and less than about 1.3, more preferably less than about 1.2, still more preferably less than about 1.15, still more preferably less than about 1.1, and even more preferably less than about 1.05.

The cooled gum rope exits from the cooling tunnel 110 and is then cut into discrete gum pieces in the cutter 150. Various types of cutters can be used. In one embodiment of the invention, the cutter comprises a chain die cutter such as shown in detail in FIG. 11, which is constructed substantially in the fashion described in U.S. Pat. No. 1,348,081 to Brach, the disclosure of which is incorporated herein by reference. The chain die cutter comprises a first chain 152 formed by a plurality of successively arranged chain links 154 each pivotally connected to the links on either end thereof, such that the chain 152 forms an endless loop. The cutter further comprises a second chain 156 of substantially similar construction, formed of chain links 158 connected to form an endless loop. The first chain 152 is looped about a pair of rotatable sprockets 160, 162 and the second chain 156 is looped about a pair of rotatable sprockets 164, 166. The downstream sprocket 162, 166 for each chain has teeth for engaging the chain links and is rotatably driven by a suitable drive device (not shown) so as to rotate the chain loops 152, 156 in opposite directions.

Figure 14:
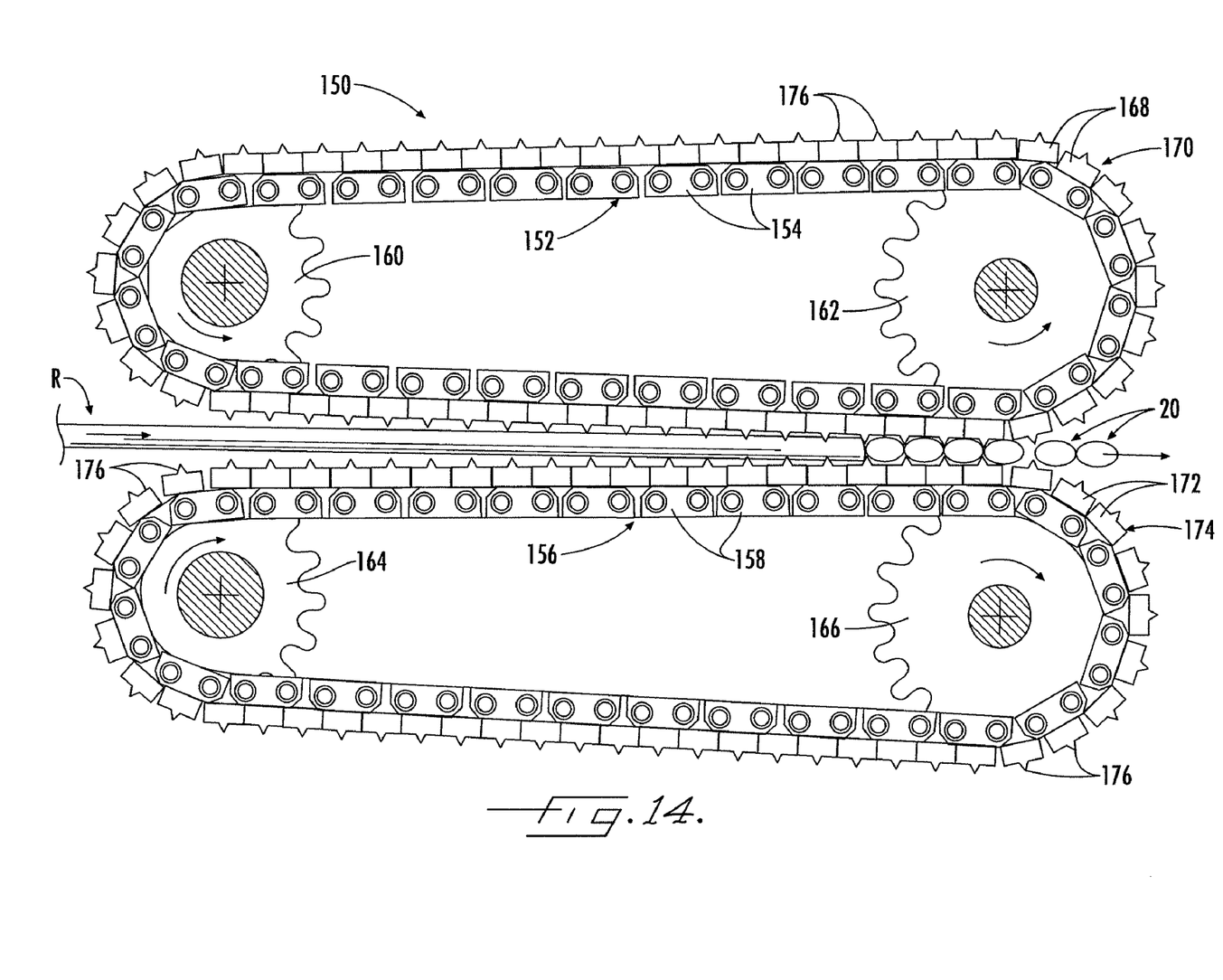
FIG. 14 is a side elevation of a chain die cutter useful in the production of dual-filled gum pieces in accordance with one embodiment of the invention.

Each chain link 154 of the first chain has a forming die 168 affixed to the link. Each forming die 168 defines a recess 170 configured as a negative impression of a portion of the desired exterior surface shape of the gum pieces to be produced. The links 156 of the second chain likewise support forming dies 172 each defining a recess 174 configured as a negative impression of a portion of the desired exterior surface shape of the gum pieces to be produced. The forming dies can be variously configured. The chains 152, 156 are positioned such that their loops are coplanar and converge upon each other in the machine direction along which the gum rope R is advanced. The chains are driven in synchronism with each other such that the dies 168 and the opposite dies 172 come together and cooperate to form molds having a negative impression of the desired exterior surface shape of the gum pieces to be produced. The dies 168, 172 define cutting edges 176 that come together to cut the gum rope into discrete gum pieces 20 that are discharged from the chain die cutter as the chains diverge in passing about the drive sprockets 162, 166. The cutting edges 176 also seal the edges of the gum pieces to enclose the liquid and powder fillings.

The final cooling unit 190 can comprise any suitable type of cooling unit for cooling the gum pieces in preparation for further downstream operations.

Such further operations can include, for example, a coating process 200 (FIG. 5) for coating the gum pieces with a hard coating or shell. Any suitable coating equipment may be used. Examples of such equipment include traditional coating pans as well as newer, high-technology systems.

In the hard coating panning procedure, the coating syrup is generally added to the gum cores at a temperature of from about 10° C. to about 90° C., and more preferably from about 30° C. to about 70° C. The coating on the gum pieces may be applied in a single hard layer or in a plurality of hard layers.

In general, applying a plurality of layers involves applying a single coat, allowing the coat to dry, and then repeating the process obtains a plurality of layers. Any number of coats may be applied to the gum cores. Preferably, the gum cores are coated with about 30 to 70 layers.

Once a portion of syrup is applied to the gum cores, the wet syrup coating is dispersing on the cores and dried; such drying is done by forced-air drying in a temperature range of from about 15° C. to about 45° C. The drying air should have relative humidity below 50% RH. Each application of a wet syrup coating to the gum pieces is followed by a distribution period without air and then a forced-air drying of the coating, and the coating and drying steps are alternated until the desired numbers of coating layers have been deposited on the gum pieces.

A protective and polishing layer of food-grade wax (e.g., carnauba wax or the like) or shellac resin may be applied over the hard coating, if desired, in order to protect the coating from exposure to atmospheric moisture and to impart a glossy finish to the gum pieces.

After coating, the gum pieces are subjected to a packaging operation 210 (FIG. 5) for shipment to distributors and/or retail outlets.

Figures 15, 16:
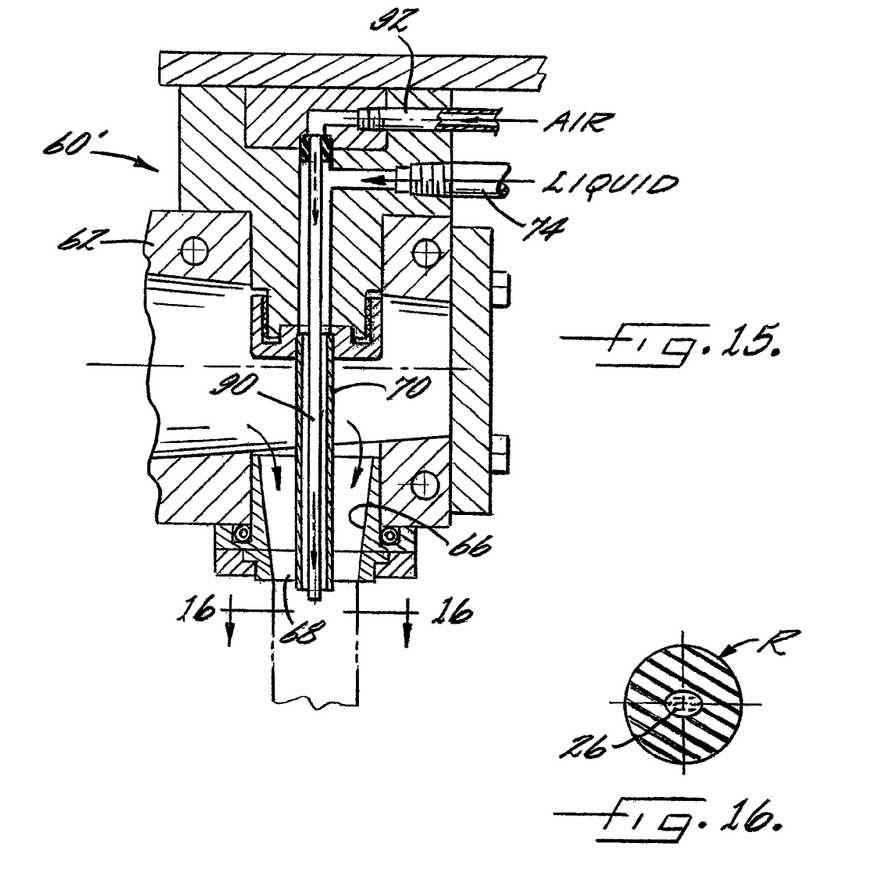
FIG. 15 is a cross-sectional view through an extruder and center filling mechanism in accordance with an alternative embodiment of the invention.
FIG. 16 is a cross-sectional view through the gum rope produced by the extruder and center filling mechanism of FIG. 15.

The gum pieces and the apparatus and process described thus far relate to dual-filled gum pieces. However, the invention is not limited to dual-filled gums, but also encompasses single-filled gums filled with liquid or powder filling. FIGS. 15 and 16 illustrate an embodiment for liquid-filled gum. An extruder and center-filling assembly 60' for producing a liquid-filled gum rope R having a single channel 26 filled with a liquid filling is depicted in FIG. 15. The assembly is generally similar to that described above in connection with FIGS. 6 through 8, and includes an extruder head 62 that defines a chamber 64 for receiving a molten and flowable gum composition from a suitable device such as an extruder screw (not shown) coupled with the extruder head. The extruder head further includes a die 66 defining a die orifice 68 through which the molten gum composition is forced from the chamber 64 under pressure so as to extrude a rope of gum from the die orifice.

The assembly 60' further comprises a center filling mechanism having a liquid filler tube 70 extending through the die orifice 68. The extruder head 62 defines a liquid feed passage 74 extending through the extruder head and connecting with the liquid filler tube 70 for feeding a liquid filling through the liquid filler tube. The center filling mechanism also includes an air tube 90 that extends down the middle of the liquid filler tube 70 for blowing air under a slightly superatmospheric pressure into the liquid-filled channel of the gum rope to assist in the filling of the channel and to prevent the development of a vacuum in the liquid-filled channel that could cause the gum rope or the finished gum pieces to shrink or distort. The air tube 90 is connected to an air feed passage 92 in the extruder head 62, which receives pressurized air from a suitable source (not shown).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making filled chewing gum pieces, comprising the steps of:
    extruding a molten gum rope having a longitudinally extending first channel and a longitudinally extending second channel separate from the first channel;
    filling the first channel with a liquid filling, and filling the second channel with a powder filling;
    sizing the gum rope to reduce the cross-sectional size of the gum rope and to shape the gum rope to have a non-round cross-sectional shape with a greater dimension in a width direction along which the first and second channels are spaced than in a height direction;
    cooling the sized and shaped gum rope; and
    cutting the cooled gum rope into discrete gum pieces.

2. The method of claim 1, wherein the cooling step comprises:
    longitudinally advancing the sized and shaped gum rope along a serpentine path through a cooling tunnel, the serpentine path lying substantially in a vertical plane such that the gum rope is substantially prevented from bending in a side-to-side fashion.

3. The method of claim 2, wherein the gum rope is caused to travel the serpentine path by a series of vertically spaced, horizontal belt conveyors each traveling in a horizontal direction opposite to that of the immediately prior belt conveyor.

4. The method of claim 1, wherein the cutting step comprises cutting the gum rope with a chain die cutter.

5. The method of claim 1, further comprising the step of cooling the gum pieces.

6. The method of claim 5, further comprising the step of coating the cooled gum pieces with a hard coating.

7. A method for making filled chewing gum pieces, comprising the steps of:
    extruding a molten gum rope having a longitudinally extending channel;
    filling the channel with a filling;
    advancing the gum rope horizontally through a series of pairs of sizing and shaping rollers structured and arranged to reduce the cross-sectional size of the gum rope and to shape the gum rope to have a non-round cross-sectional shape with a greater dimension in a horizontal width direction than in a vertical height direction;
cooling the sized and shaped gum rope; and
cutting the cooled gum rope into discrete gum pieces,
wherein the cooling step comprises carrying the gum rope along a serpentine path that lies substantially in a vertical plane such that the gum rope is substantially prevented from bending in a horizontal side-to-side fashion, and blowing air across the gum rope as the gum rope traverses the serpentine path.

* * * * *